US 9,465,417 B2

United States Patent
Zhu et al.

(10) Patent No.: US 9,465,417 B2
(45) Date of Patent: Oct. 11, 2016

(54) CLUSTER SYSTEM, METHOD AND DEVICE FOR EXPANDING CLUSTER SYSTEM

(75) Inventors: Jianbo Zhu, Beijing (CN); Lingqiang Fan, Shenzhen (CN); Bing Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 404 days.

(21) Appl. No.: 13/096,588

(22) Filed: Apr. 28, 2011

(65) Prior Publication Data

US 2011/0208844 A1 Aug. 25, 2011

Related U.S. Application Data

(63) Continuation of application No. PCT/CN2009/074629, filed on Oct. 27, 2009.

(30) Foreign Application Priority Data

Oct. 29, 2008 (CN) .......................... 2008 1 0218731
Nov. 18, 2008 (CN) .......................... 2008 1 0181547

(51) Int. Cl.
*G06F 11/20* (2006.01)
*H04L 12/26* (2006.01)
(Continued)

(52) U.S. Cl.
CPC ............... *G06F 1/189* (2013.01); *G06F 1/26* (2013.01); *G06F 11/2007* (2013.01); *G06F 11/2035* (2013.01); *H04L 43/0811* (2013.01); *H04L 45/58* (2013.01)

(58) Field of Classification Search
CPC ............ G06F 1/189; G06F 11/2035; G06F 11/2007; G06F 1/26; H04L 45/58; H04L 43/0811
See application file for complete search history.

(56) References Cited

U.S. PATENT DOCUMENTS 5,408,649 A * 4/1995 Beshears et al. ............... 714/10
6,195,687 B1 * 2/2001 Greaves et al. ............. 709/208
(Continued)

FOREIGN PATENT DOCUMENTS

CN  1414749 A   4/2003
CN  1558624 A   12/2004
(Continued)

OTHER PUBLICATIONS

Lawrence Awuah, Multi-Stage Clos Networks in Router Architecture, Fall 2007, George Mason University, 1-15.*
(Continued)

*Primary Examiner* — Anthony Mejia
*Assistant Examiner* — Joseph M Cousins
(74) *Attorney, Agent, or Firm* — Brinks Gilson & Lione

(57) ABSTRACT

A method for expanding a cluster system is provided. The cluster system includes at least one Cluster Central Chassis (CCC), and a newly-added Cluster Line-card Chassis (CLC) connected with the CCC to form the cluster system. The method includes the following steps. A control plane is established. An equipment management right is switched to the CCC, so that the CCC manages the newly-added CLC. Meanwhile, a cluster line-card device, a cluster central exchange device, and a cluster system are further provided. In implementation, smooth expansion can be achieved without interrupting running equipment services in the CLC current network and without interrupting data services. Moreover, during the expansion process, hardware equipment needs not to be replaced, thus investment of users on the equipment is reduced.

9 Claims, 5 Drawing Sheets

(51) Int. Cl.
*H04L 12/775* (2013.01)
*G06F 1/18* (2006.01)
*G06F 1/26* (2006.01)

(56) References Cited

U.S. PATENT DOCUMENTS

| | | | |
|---|---|---|---|
| 7,203,816 B2* | 4/2007 | Morimura et al. | 712/11 |
| 7,236,453 B2* | 6/2007 | Visser et al. | 370/219 |
| 7,304,940 B2* | 12/2007 | Larsen et al. | 370/218 |
| 7,483,998 B2* | 1/2009 | Rabinovitch | 709/238 |
| 2002/0026492 A1* | 2/2002 | Fujita | 709/208 |
| 2002/0186662 A1* | 12/2002 | Tomassetti | H04N 21/439 370/254 |
| 2004/0024942 A1* | 2/2004 | Smith | G06F 9/4405 710/305 |
| 2004/0037275 A1 | 2/2004 | Li et al. | |
| 2004/0039840 A1* | 2/2004 | Dispensa et al. | 709/242 |
| 2005/0108425 A1* | 5/2005 | Rabinovitch | 709/238 |
| 2007/0220301 A1* | 9/2007 | Brundridge | G06F 11/2028 714/4.1 |
| 2009/0031014 A1* | 1/2009 | Chu et al. | 709/222 |
| 2011/0016223 A1* | 1/2011 | Iannaccone | H04L 45/00 709/232 |
| 2011/0125920 A1* | 5/2011 | Van Der Merwe et al. | 709/235 |
| 2011/0320065 A1* | 12/2011 | Ying | 701/1 |

FOREIGN PATENT DOCUMENTS

| | | |
|---|---|---|
| CN | 1747447 A | 3/2006 |
| CN | 1983841 A | 6/2007 |
| CN | 101394309 A | 3/2009 |

OTHER PUBLICATIONS

Written Opinion of the International Searching Authority issued in corresponding PCT Patent Application No. PCT/CN2009/074629, mailed Feb. 4, 2010.

International Search Report issued in corresponding PCT Patent Application No. PCT/CN2009/074629, mailed Feb. 4, 2010.

* cited by examiner

CLUSTER SYSTEM, METHOD AND DEVICE FOR EXPANDING CLUSTER SYSTEM

CROSS-REFERENCE TO RELATED APPLICATIONS

This application is a continuation of International Application No. PCT/CN2009/074629, filed on Oct. 27, 2009, which claims priority to Chinese Patent Application No. 200810218731.8, filed on Oct. 29, 2008 and Chinese Patent Application No. 200810181547.0, filed on Nov. 18, 2008, all of which are hereby incorporated by reference in their entireties.

FIELD OF THE TECHNOLOGY

The present invention relates to the field of network communications, and more particularly to, a cluster line-card device, a cluster central exchange device, a cluster system, and a method for expanding a cluster system.

BACKGROUND OF THE INVENTION

With further development of the network, the user bandwidth is increased at a high speed. Operators find that in many core application scenes, capacity and slots of a single router can no longer meet business demands. Super core nodes actually become a bottleneck of further business development for telecommunication operators. As a network cluster system, the router provides High Available (HA) data transmission for telecommunication operators, thus the router is required to be HA and expandable.

An exchange plane of the existing router equipment adopts single-stage exchange, and a router cluster equipment is composed of a Cluster Central Chassis (CCC) and a Cluster Line-card Chassis (CLC). The existing router cluster equipment adopts a three-stage Clos structure, and achieves a three-stage exchange mechanism, where the first stage and the third stage exchange are performed in the CLC, and the CCC finishes the second stage exchange among chassis. In the management plane of the existing router cluster equipment, each CLC is connected with a CCC via two links (two links forming an active/standby relationship) to form a data channel, and via the data channel, the CCC manages the CLC, processes and delivers related routing.

A router cluster is also called a router matrix or multi-chassis interconnection (Multi-Chassis). Simply speaking, multiple routers are interconnected to form a logically integrated router system. The generation of the cluster technology has two direct reasons: Firstly, capacity of a single machine has gradually developed to a limit; secondly, due to the generation of super nodes, the network structure is increasingly complicated and maintenance and management are more difficult.

The objective of introducing the cluster technology to the router field is to connect two or more common core routers in a certain manner, so that the core routers can perform cooperative work and parallel processing among equipments. Therefore, smooth expansion of system capacity is achieved, and the routers appear as just one logical router when viewed from outside. Users hope to expand capacity and slots of certain nodes without affecting original equipment services, and to form a router cluster equipment to meet a higher capacity of the users, that is, it is required to realize smooth expansion. In the prior art, if the CLC and the CCC need to act as a set of cluster equipment, the expansion process is performed when services are not running. Cables between the CCC and the CLC should be connected, configurations should be done on the two equipments, and finally a set of cluster is formed through restarting.

In the prior art, no matter adding a CLC or a CCC, the equipment expansion is performed when CLC services are interrupted, while smooth expansion cannot be performed without interrupting the data services.

SUMMARY OF THE INVENTION

Embodiments of the present invention provide, a cluster line-card device, a cluster central exchange device, and a cluster system, and a method for expanding a cluster system, which are capable of expanding a router equipment into a router cluster equipment in an on-line manner without affecting services of the running router equipment in a current network.

An embodiment of the present invention provides a method for expanding a cluster system, where the cluster system includes at least one CCC, and a newly-added CLC connected with the CCC to form the cluster system. The method includes the following steps.

A control plane is established.

An equipment management right is switched to the CCC, so that the CCC manages the newly-added CLC.

Accordingly, an embodiment of the present invention further provides a cluster line-card device, where the luster line-card device is a CLC connected with a CCC. The CLC includes a port (11), a control plane establishing unit (12), and a switching unit (13).

The port (11) is configured to connect with the CCC.

The control plane establishing unit (12) is configured to establish a control plane.

The switching unit (13) is configured to switch an equipment management right of the CLC to the CCC, so that the CCC manages the CLC.

Accordingly, an embodiment of the present invention further provides a cluster central exchange device, connected with a CLC to form a cluster system. The cluster central exchange device includes a CLC port (41), a registering unit (42), a standby relationship processing unit (43), and a management unit (44).

The CLC port (41) is configured to connect with the CLC.

The registering unit (42) is configured to register with the CLC via an idle port of an active port or a standby port, so as to become a slave chassis of the CLC.

The standby relationship processing unit (43) is configured to notify the CLC that changing of a standby relationship is acceptable.

The management unit (44) is configured to manage the CLC after the CLC finishes a control switching.

Accordingly, an embodiment of the present invention further provides a cluster system, where the system includes at least one cluster central exchange device and a newly-added cluster line-card device.

In the implementation of the present invention, smooth expansion can be achieved without interrupting running equipment services in the CLC current network and without interrupting data services. Moreover, during the expansion process, hardware equipment needs not to be replaced, thus investment of users on the equipment is reduced.

DETAILED DESCRIPTION OF THE EMBODIMENTS

Figure 1:
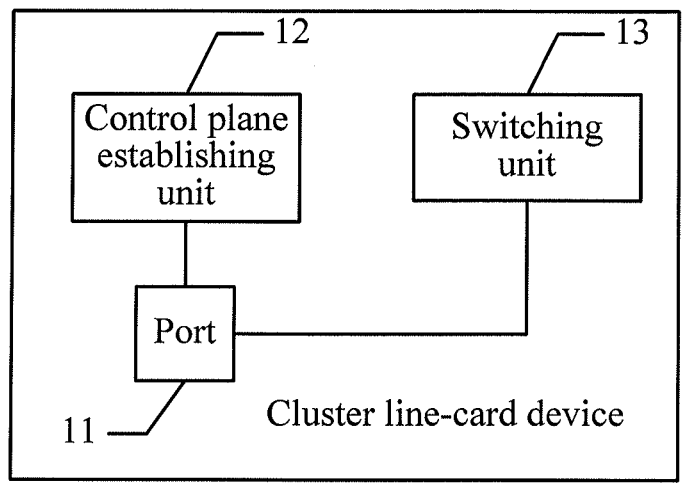
FIG. 1 is a schematic structural view of a cluster line-card device according to an embodiment of the present invention.

A CCC is configured to monitor, manage, and maintain a whole cluster equipment, connect with each CLC, and provide a data exchange channel of an exchange plane among multiple CLCs. The CCC may include a Main Processing Unit (MPU), an Internal Communication Unit (ICU), a Switch Fabric Unit (SFU), an Electric Cross Unit (ECU), an Optical Flexible Card (OFC) on the ECU, and other units.

The MPU is a control and management core of a system, and as a maintenance and management unit, the MPU finishes functions of a control plane and an exchange plane. A CCC commonly includes two MPUs, thereby forming a standby to ensure reliability.

As an exchange network module of the CCC, the SFU is mainly configured to realize a service exchange function among different CLCs. The OFC is an interface card on the ECU, and is configured to perform optical-electric and electric-optical conversions. The OFC can realize a flow relay between the CCC and each CLC, and form a data channel between the CCC and the CLC.

The ECU is configured to realize a service channel of a multiple-chassis cluster router by cooperating with the OFC and the SFU. As a part of a service processing of the CCC, the ECU is configured to complete a relay between the SFU and the OFC.

The ICU is configured to realize a reliable control information transmission between the CCCs, and between the CCC and the CLC. For example, in a CCC-1 system (having one CCC), the ICU of the CCC may connect with MPUs of four CLCs via Ethernet interfaces, so as to send control information of the MPUs of the CLCs to the MPU of the CCC, and deliver control information of the MPU of the CCC to the MPUs of each CLC. In a CCC-2 system (having two CCCs), the ICU not only completes the control channel between the CCC and the CLC, but also realizes a control channel between two CCCs. Therefore, the ICU may include a CLC interface, for example, an interface of Ethernet type, configured to connect with a cascade interface on the MPU of the CLC; the ICU further includes a CCC interface, for example, an interface of Ethernet type, configured to connect with other CCCs, and the ICUs of each CCC can be connected via the interface to form a Rapid Ring Protection Protocol (RRPP) ring. For example, in the CCC-2 system, if a CCC interface exists, a CCC can be connected with another CCC, however, when the cluster system expands to a CCC-4 or more CCCs, each CCC may need two CCC interfaces to connect with other CCCs in the cluster system, where all the CCCs form a ring.

In a cluster router composed of multiple chassis, that is, multiple routers, each chassis is called a CLC. Each CLC may include an MPU, an SFU, a line interface processing unit (LPU), and other units, where, the MPU is a main exchange unit, responsible for a centralized control and management and data exchange of the system. Commonly, each CLC may include two MPUs, thereby forming a standby to ensure reliability. The SFU is configured to realize a centralized and fast exchange of service data. The LPU is configured to fast process and forward services, and maintain and manage link protocol and service forwarding tables.

FIG. 1 is a schematic structural view of a cluster line-card device according to an embodiment of the present invention. In the embodiment of the present invention, the cluster line-card device is a CLC connected with a CCC. As shown in FIG. 1, the CLC includes a port 11, a control plane establishing unit 12, and a switching unit 13.

The port 11 is configured to connect with the CCC. One or two ports are acceptable, and if two ports exist, one of the two ports is an active port connected with the CCC, and the other is a standby port connected with the CCC. Specifically, in the implementation, the ports may be ports of Ethernet type, for example, a Gigabit Ethernet (GE) port and a Fast Ethernet (FE) port.

The control plane establishing unit 12 is configured to establish a control plane.

The switching unit 13 is configured to switch an equipment management right of the CLC to the CCC, so that the CCC manages the CLC. When the CLC is connected with the CCC via active and standby links, the equipment management right of the CLC can be switched to the CCC via an idle link of the active and standby links. Specifically, the switching unit 13 rearranges the active and standby MPUs, and changes an operation mode of the newly-added CLC to a three-stage exchange mode.

Figure 2:
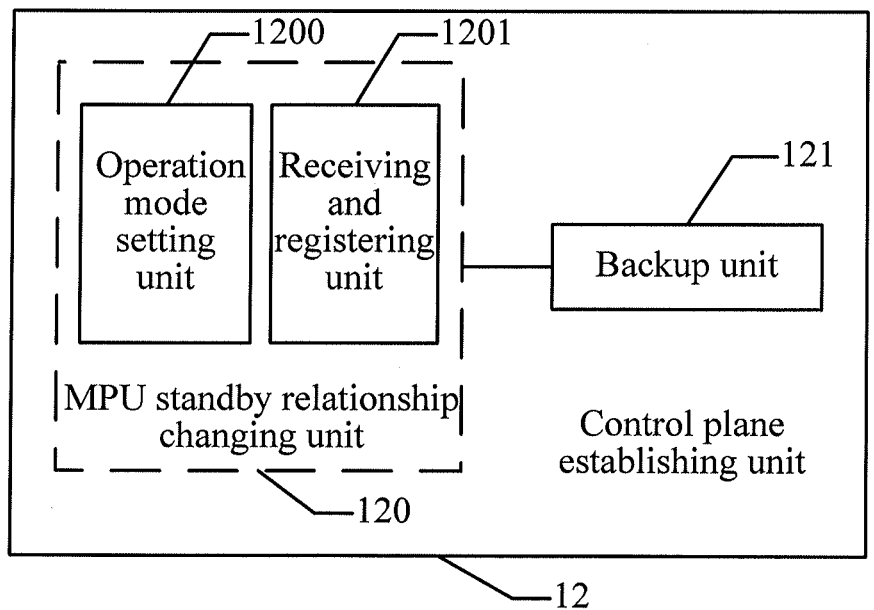
FIG. 2 is a schematic structural view of a control plane establishing unit of the cluster line-card device in FIG. 1.

FIG. 2 is a schematic structural view of the control plane establishing unit 12. As shown in FIG. 2, the control plane establishing unit 12 includes an MPU standby relationship changing unit 120 and a backup unit 121.

The MPU standby relationship changing unit 120 is configured to change a standby relationship of MPUs of the CLC.

The backup unit 121 is configured to back up configuration information of an active MPU of the CLC to an active MPU of the CCC, that is, a standby MPU of the CLC is changed into the active MPU of the CCC. Here, the active MPU of the CLC is still the active MPU of the original CLC, but the standby MPU of the CLC is the active MPU of the CCC.

The MPU standby relationship changing unit 120 includes an operation mode setting unit 1200 and a receiving and registering unit 1201.

The operation mode setting unit 1200 is configured to change an operation mode of the CLC to a multi-chassis operation mode.

The receiving and registering unit 1201 is configured to receive registration from the CCC via an idle port of an active port or a standby port, and register the CCC as a slave chassis of the CLC, after the operation mode setting unit 1200 changes the operation mode as the multi-chassis operation mode.

A user can directly operate on the CLC to trigger the MPU standby relationship changing unit 120 to change the standby relationship.

Figure 3:
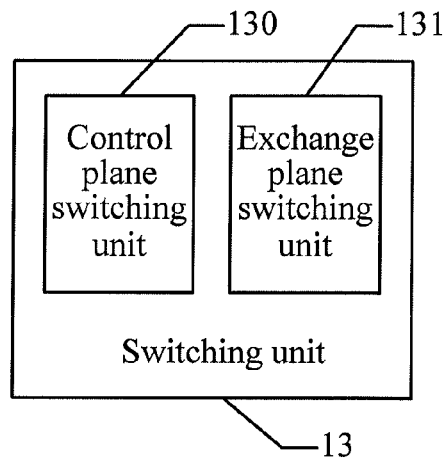
FIG. 3 is a schematic structural view of a switching unit of the cluster line-card device in FIG. 1.

FIG. 3 is a schematic structural view of the switching unit 13. As shown in FIG. 3, the switching unit 13 includes a control plane switching unit 130 and an exchange plane switching unit 131.

The control plane switching unit 130 is configured to switch the active MPU to an active MPU of the CCC and rearrange the active and standby MPUs. Here, the active MPU of the CCC becomes the active MPU of the CLC, thereby completing control plane switching.

The exchange plane switching unit 131 is configured to change the operation mode of the SFU of the CLC to a three-stage exchange mode.

A user may directly operate on the CLC to trigger the switching unit 13 to work, and may also operate on the CCC to receive signals from the CCC via the idle port of the active port or the standby port, so as to trigger the switching unit 13 to work.

The MPU standby relationship changing unit 120 is further configured to change the standby relationship of the MPUs after the cluster system is expanded. During the process of expanding the cluster system, the MPU standby relationship changing unit 120 realizes a 1:1 standby of cross-chassis MPUs in the cluster system, that is, an active MPU (the active MPU of the CLC) and a standby MPU (the active MPU of the CCC). After the cluster system is expanded, the standby relationship can still be used or be changed. For example, the standby relationship is changed to 1:N standby. Taking a CCC-2 cluster system as an example, the CCC-2 cluster system has 2 CCCs, and each CCC commonly has two MPUs forming the active/standby relationship to meet the reliability demand. Therefore, the CCC-2 cluster system actually has four MPUs, and if the 1:1 standby of the cross-chassis MPUs is realized, the cluster system actually has two idle MPUs. In order to improve the reliability of the system and avoid wasting resources, the two idle MPUs can be used as a sub-standby MPU and a sub-sub standby MPU, thereby realizing 1:3 standby of the cross-chassis MPUs.

The CLC in the embodiment of the present invention includes an MPU, and the ports and the units can be disposed on the MPU.

Figure 4:
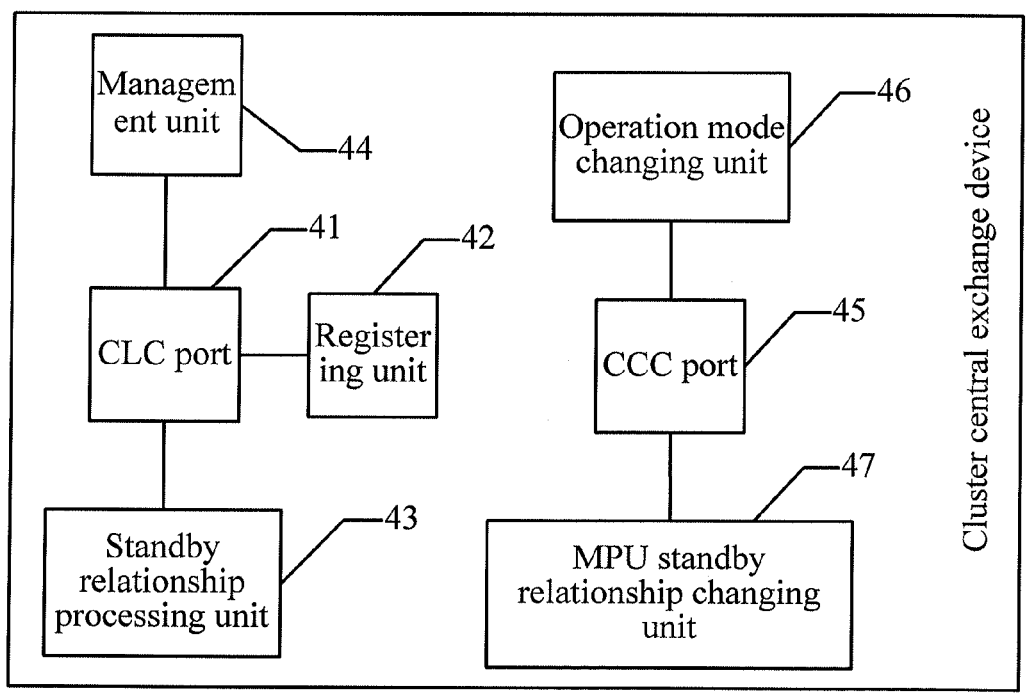
FIG. 4 is a schematic structural view of a cluster central exchange device according to an embodiment the present invention.

FIG. 4 is a schematic structural view of a cluster central exchange device according to an embodiment of the present invention. In the embodiment of the present invention, the cluster central exchange device is a CCC connected with a CLC. Optionally, the CCC can be connected with the CLC via active and standby links. As shown in FIG. 4, the CCC includes a CLC port 41, a registering unit 42, a standby relationship processing unit 43, and a management unit 44.

The CLC port 41 is configured to connect with the CLC. One or two ports are acceptable, and if two ports exist, one of the two ports is an active port connected with the CLC, and the other is a standby port connected with the CLC. Specifically, in the implementation, the ports may be ports of Ethernet type, for example, a GE port and an FE port.

The registering unit 42 is configured to register with the CLC via an idle port of an active port or a standby port, so as to become a slave chassis of the CLC.

The standby relationship processing unit 43 is configured to notify the CLC that changing of a standby relationship is acceptable. For example, when implemented with HA solutions, the module changes an HA state of the CCC to a multi-chassis batch standby state, constructs and sends a notification message to a newly-added CLC, so that the CLC changes the standby relationship of MPUs after receiving the notification message.

The management unit (44) is configured to manage the CLC after the CLC finishes a control switching.

When the cluster system has a newly-added CCC, the original CCC further includes a CCC port 45, an operation mode changing unit 46, and an MPU standby relationship changing unit 47.

The CCC port 45 is configured to connect with the CCC in the cluster system. One or two CCC ports 45 are acceptable, and if two ports exist, the CCCs of the cluster system can be connected into a ring.

The operation mode changing unit 46 is configured to change an operation mode of the newly-added CCC.

The MPU standby relationship changing unit 47 is configured to change an active/standby relationship of the MPUs of the CCC. Specifically, the standby MPU of the current CCC is set as an active MPU of the newly-added CCC, that is, the active MPU of the current CCC remains unchanged, and the current CCC takes the active MPU of the newly-added CCC as its own standby MPU. Thus, data backup can be achieved, that is, the current CCC backs up the data on the active MPU to the standby MPU, that is, the active MPU of the newly-added CCC.

Accordingly, an ICU card further includes a communication unit, configured to communicate with other CCCs in the cluster system and select an active CCC when more than two CCCs exist in the cluster system.

In this embodiment, the CCC includes an MPU, and the ports and the units can be disposed on the MPU.

Figure 5:
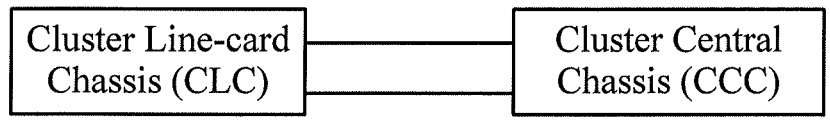
FIG. 5 is a schematic structural view of a cluster system according to an embodiment of the present invention.

FIG. 5 is a schematic structural view of a cluster system according an embodiment of to the present invention. As shown in FIG. 5, the system includes at least one CCC and a newly-added CLC. The CCC is the cluster central exchange device as shown in FIG. 4, the CLC is the cluster line-card device as shown in FIG. 1, and the CCC is connected with the CLC. The newly-added CLC is configured to change a standby relationship of its own MPUs, back up configuration information of an active MPU to an active MPU of the CCC, and switch an equipment management right to the CCC; and the CCC is configured to manage the cluster system.

Figure 6:
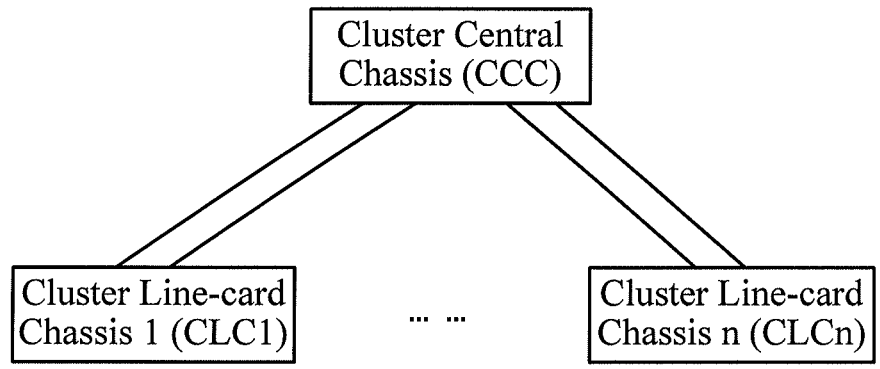
FIG. 6 is a schematic structural view of a cluster system according to an embodiment of the present invention.

FIG. 6 is a schematic structural view of a cluster system according to another embodiment of the present invention. As shown in FIG. 6, the system includes a CCC and n CLCs (n is a natural number greater than 1), forming a CCC+nCLC cluster system. The operating principle and the expanding method are as described in the foregoing embodiments. The CLCs are added based on a CCC+CLC cluster system, so as to expand into a CCC+nCLC cluster system, and the newly-added CLCs only need to directly connect with the CCC. The CLC is the cluster line-card device as shown in FIG. 1, and the CCC is the cluster central exchange device as shown in FIG. 4, which will not be described herein again.

The device and the system will be further described in detail with reference to embodiments of the method of the present invention.

Figure 7:
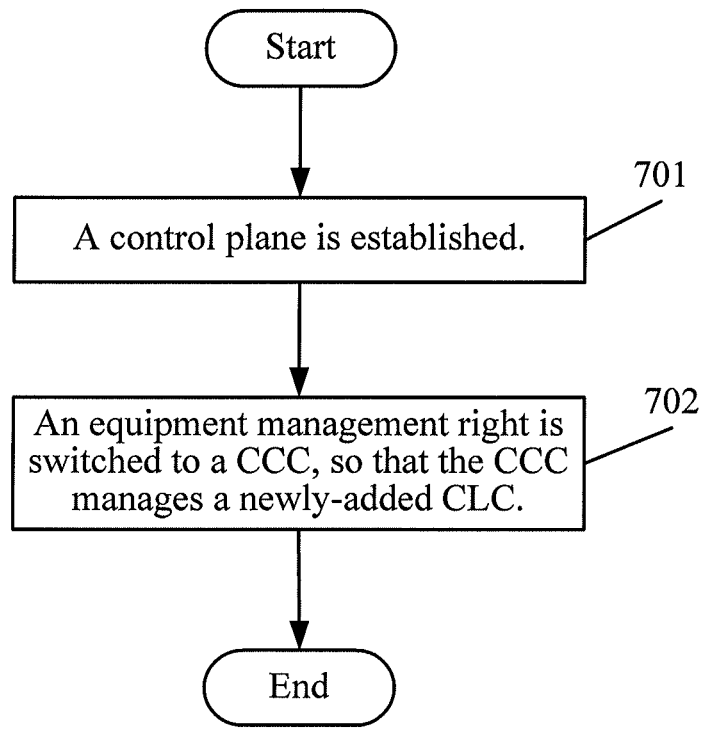
FIG. 7 is a schematic flow chart of a method for expanding a cluster system according to an embodiment of the present invention.

FIG. 7 is a schematic flow chart of a method for expanding a cluster system according to an embodiment of the present invention. In this embodiment, expansion is achieved by adding CLCs to a CCC. In this method, the cluster system includes at least one CCC. As shown in FIG. 7, the method includes the following steps.

In step 701, a control plane is established. A standby relationship of MPUs of the CLC is changed, and configuration information of an active MPU of the CLC is backed up to an active MPU of the CCC. The CCC is connected with a newly-added CLC via active and standby links. The active and standby links between the CCC and the CLC are mainly configured to perform an interaction for internal management information, including information backup. The two links are in a standby relationship, and when a link fails, management information interaction may also be performed via another link. The CCC is connected with the CLC via the two links, and specifically, the active and standby links can be connected with the CLC and the CCC in a connection manner of a network cable.

Here, a management right of the CLC is still on the CLC, and the processing and delivering of related routing of the CLC+CCC cluster system still has to be finished by the CLC. Therefore, the equipment management right of the CLC needs to be switched to the CCC, and then the CCC manages the whole CLC+CCC cluster system.

As shown in step 702 of FIG. 7, the equipment management right is switched to the CCC, so that the CCC manages the newly-added CLC. Since the management right of the newly-added CLC is still on the CLC here, no information interaction is performed between the newly-added CLC and the CCC, and both the active and standby links are in an idle state. The control right can be switched via any link of the active and standby links. Preferably, when both the active and standby links are idle, the active link is preferably selected. Step 702 (see FIG. 7) can be implemented with HA solutions, which are common technical solutions of the field, and will not be described herein again. In the specific implementation of step 702 (see FIG. 7), a user can switch the equipment management right to the CCC by performing manual configuration on the CLC, or the equipment management right is automatically switched after automatic detection of the CLC or the CCC. By adopting the switching method, the objective of switching the equipment management right can be achieved, which is apparent to persons skilled in the art, and will not be described herein again. After the equipment management right is switched to the CCC via an idle link of the active and standby links, the CCC manages the newly-added CLC. Specifically, the CCC manages the CLC+CCC cluster equipment through the MPUs.

Figure 8:
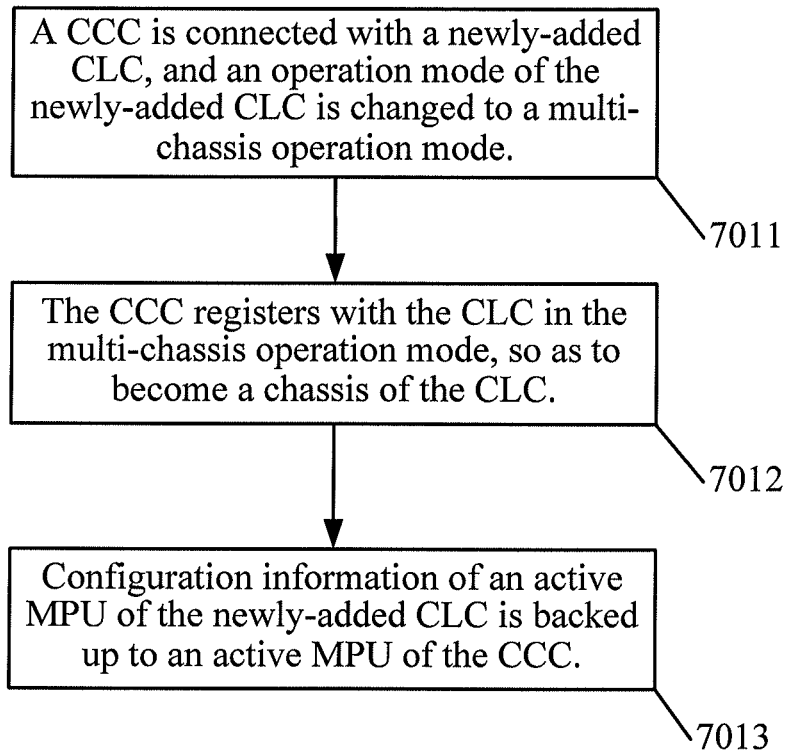
FIG. 8 is a specific schematic flow chart of establishing a control plane in the method for expanding the cluster system in FIG. 7.

The process of establishing the control plane in the step 701 (see FIG. 7) is as shown in FIG. 8, and includes the following specific steps.

In step 7011, the CCC is connected with the newly-added CLC, and an operation mode of the newly-added CLC is changed to a multi-chassis operation mode. The operation mode of the CLC includes two types being single-chassis and multi-chassis, which is definitely known to persons skilled in the art. Here, the CCC should also be in the multi-chassis operation mode. The CCC may have many operation modes to indicate how many CCCs the cluster system has. For example, when the operation mode of the CCC is the multi-chassis operation mode being the CCC-1, it indicates that the whole cluster system includes a CCC. Optionally, the CCC is connected with the CLC via active and standby links.

In step 7012, the CCC registers with the CLC in the multi-chassis operation mode, so as to become a chassis of the CLC. Here, the CLC considers that the CLC is an active chassis and the CCC is a slave chassis of the CLC. After the CCC registers with the currently running CLC, a user can log in to the CCC from the CLC to check a status of the whole cluster system, so to change configurations.

In step 7013, the standby relationship of the MPUs of the newly-added CLC is changed, and the configuration information of the active MPU of the newly-added CLC is backed up to the active MPU of the CCC, that is, the standby MPU of the CLC is changed to the active MPU of the CCC. Here, the active MPU of the CLC is still the active MPU of the original CLC, but the standby MPU of the CLC is the active MPU of the CCC. The configuration information of the active MPU of the CLC is backed up to the active MPU of the CCC, that is, the active MPU on the CCC, with HA solutions.

Figure 9:
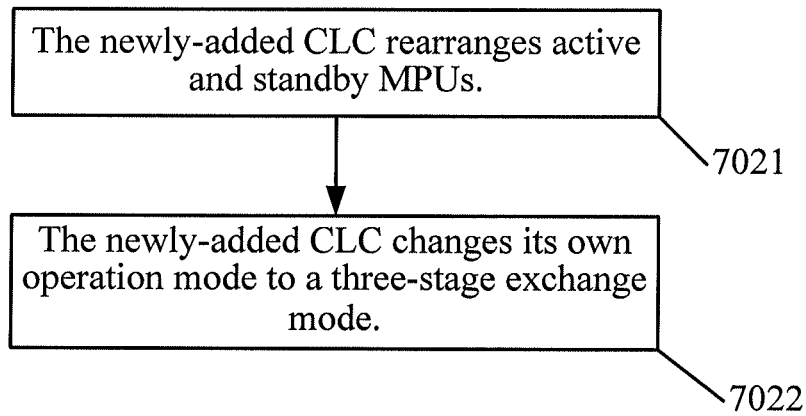
FIG. 9 is a specific schematic flow chart of switching an equipment management right in the method for expanding the cluster system in FIG. 7.

In step 702 (see FIG. 7), the process of switching the equipment management right from the CLC to the CCC specifically includes control plane switching and exchange plane switching, which are shown in FIG. 9 and will be described below in detail respectively.

In step 7021, a control plane is switched, and the newly-added CLC rearranges the active and standby MPUs. Here, the active MPU of the CCC becomes the active MPU of the CLC, and the control plane switching is finished.

In step 7022, an exchange plane is switched, and the newly-added CLC changes its own operation mode to a three-stage exchange mode. The exchange plane switching is switch data forwarding. Since the original operation mode of the newly-added CLC is a single-stage exchange mode, which now needs to be changed to the three-stage exchange mode, that is, the CCC acts as a second stage exchange network equipment, and an SFU of the line-card chassis acts as a first or third stage switched network, so as to form a cluster router system with multi-stage equipment cascading and three-stage user traffic exchange, so that data exchange among each service unit can be performed. Specifically, in the implementation, since the newly-added CLC includes N+1 SFUs, where N SFUs are responsible for data exchange, and one SFU acts as a standby for the N SFUs, so that since the standby SFU exists, the operation mode of the N SFUs can be changed into the multi-chassis operation mode one by one.

After the equipment management right of the CLC is switched to the CCC, the MPU of the CCC manages the whole CLC+CCC cluster equipment. In this embodiment, smooth expansion is achieved by adding new CLCs to the CCC without restarting, thus improving the reliability of smooth expansion of the cluster system.

The system can be called a CCC+nCLC cluster system. In an actual application, the number of CLCs connected with the CCC is limited, for example, a CCC commonly can support to connect with four CLCs at the utmost. When the CCC is connected with the CLCs, and the system capacity is still not enough, the system capacity needs to be further expanded by adding a new CCC, thereby forming a 2CCC+nCLC cluster system.

Figure 10:
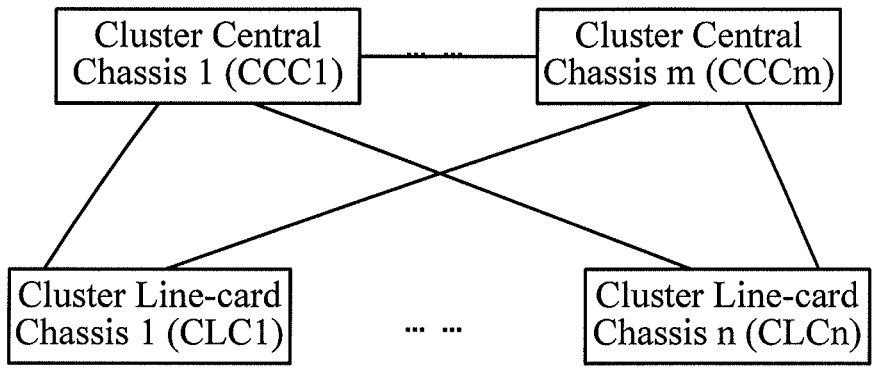
FIG. 10 is a schematic structural view of a cluster system according to an embodiment of the present invention.

Therefore, another embodiment of the present invention provides a cluster system. FIG. 10 is a schematic structural view of a cluster system according to another embodiment of the present invention. As shown in FIG. 10, the system is an mCCC+nCLC (both m and n are natural numbers greater than 1) cluster system. The CLC is the cluster line-card device in FIG. 1, and the CCC is the cluster central exchange device in FIG. 4, which will not be described herein again.

Figure 11:
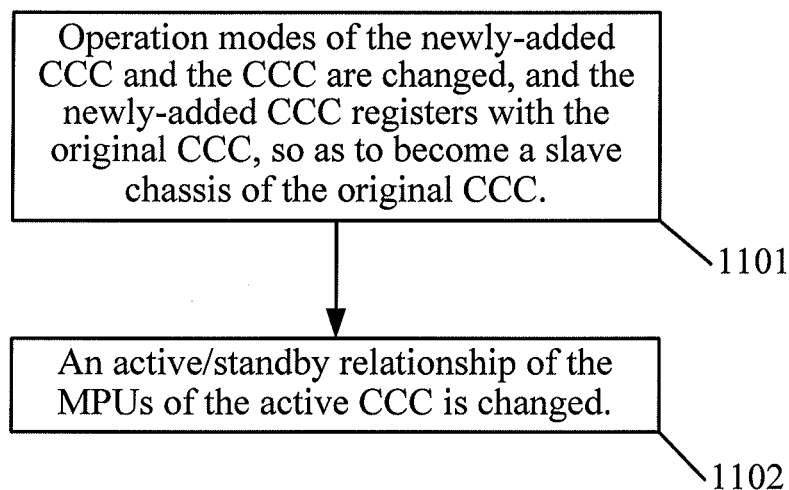
FIG. 11 is a schematic flow chart of a method for expanding a cluster system according to an embodiment of the present invention.

Accordingly, another embodiment of the present invention further provides another method for expanding a cluster system. FIG. 11 is a schematic flow chart of a method for expanding a cluster system according to an embodiment of the present invention. As shown in FIG. 11, if the cluster system further includes a newly-added CCC, the newly-added CCC is connected with the CCC, and the newly-added CCC is connected with a newly-added CLC. The method further includes the following steps.

In step 1101, operation modes of the newly-added CCC and the CCC are changed, and the newly-added CCC registers with the active CCC. The operation modes of the newly-added CCC and the CCC are changed into a CCC-2 operation mode. Since a CCC-1 system has only one CCC, the original CC may also be considered as an active CCC. The newly-added CCC registers with the original CCC, so as to become a chassis of the original CCC. For example, if the original system is the CCC-1 system and needs to form a CCC-2 system by newly adding one CCC, the newly-added CCC registers with the original CCC in the original cluster system, so as to become a chassis of the original CCC. Similarly, if the original system is the CCC-m system and needs to form a CCC-(m+1) system by adding one new CCC, operation modes of the original m CCCs and the newly-added CCC are all set as CCC-(m+1), and the newly-added CCC just registers with the active CCC.

In step 1102, an active/standby relationship of the MPUs of the active CCC is changed. Specifically, the standby MPU of the active CCC is set as an active MPU of the newly-added CCC, that is, the active MPU of the active CCC remains unchanged, and the active CCC takes the active MPU of the newly-added CCC as its own standby MPU. Thus, data standby can be achieved, that is, the active CCC backs up data of the active MPU to the standby MPU, that is, the active MPU of the newly-added CCC.

If the cluster system has only two CCCs, the two CCCs are in an active/standby relationship, and at a certain moment, the MPU of only one CCC is working. Here, the original CCC is also called an active CCC, and the newly-added CCC is called a standby CCC. The active CCC controls the whole system, including management, routing, and protocol of equipment level. When the active CCC fails, the standby CCC takes over to control the whole system, so as to serve as a standby. When the active MPU of the active CCC fails, the standby MPU of the active CCC, that is, the active MPU of the standby CCC, takes over corresponding work. Actually, the standby CCC takes over the work of the active CCC.

If the cluster system has N (N is a natural number greater than 3) CCCs, the N CCCs can form a ring by connecting with each other in a pair-wise manner, and by running ring network protocols, for example, a Resilient Packet Ring (RPR) protocol and an RRPP, the reliability of the CCCs is ensured.

In the foregoing embodiments, in order to improve the reliability of the communication between the CLC and the CCC, the CLC is connected with the CCC via two active and standby links. Apparently, the CLC may also be connected with the CCC via only one link.

Since the time sequence of adding a new CLC or a new CCC is not limited, the two foregoing embodiments can be implemented separately or together.

The method for expanding the cluster system in the embodiment further includes changing the standby relationship of the MPUs after the cluster system is expanded. In the process of expanding the cluster system, a 1:1 standby of cross-chassis MPUs is realized in the cluster system, that is, an active MPU (the active MPU of the CLC) and a standby MPU (the active MPU of the CCC). After the cluster system is expanded, the standby relationship can still be used or be changed. For example, the standby relationship is changed to 1:N standby. Taking a CCC-2 cluster system as an example, the CCC-2 cluster system has 2 CCCs, and each CCC commonly has two MPUs forming the active/standby relationship to meet the reliability demand. Therefore, the CCC-2 cluster system actually has four MPUs, and if the 1:1 standby of the cross-chassis MPUs is realized, the cluster system actually has two idle MPUs. In order to improve the reliability of the system and avoid wasting resources, the two idle MPUs can be used as a sub-standby MPU and a sub-sub standby MPU, thereby realizing 1:3 standby of the cross-chassis MPUs.

In the embodiment of the present invention, the idle link may be the active link or the standby link of the active and standby links. When both the active link and the standby link are idle, the active link is preferably selected.

In the cluster system of the embodiment of the present invention, when a CCC or a CLC is newly added, smooth expansion can be achieved without interrupting running equipment services in the CLC current network and without interrupting the data services. Moreover, during the expansion process, hardware equipment needs not to be replaced, thus investment of users on the equipment is reduced.

Through the above description in the detailed description, it is clear to persons skilled in the art that the present invention may be accomplished through software plus necessary universal hardware platform, or through hardware. Based on such understandings, the technical solution of the present invention may be embodied in the form of a software product. The software product may be stored in a nonvolatile storage medium, which can be a magnetic disk, a Compact Disk Read-Only Memory (CD-ROM), a Read-Only Memory (ROM) or a Random Access Memory (RAM). The software product includes a number of instructions that enable a computer device (personal computer, server, or network device) to execute the methods provided in the embodiments of the present invention.

The above descriptions are merely some exemplary embodiments of the present invention, but not intended to limit the scope of the present invention. Any modification, equivalent replacement, or improvement made according to the appended claims of the present invention should fall within the scope of the present invention.

What is claimed is:

1. A method for expanding a router cluster system, wherein the router cluster system comprises at least one Cluster Central Chassis (CCC) having at least two processing units (MPUs), and a newly-added Cluster Line-card Chassis (CLC) which comprises at least one MPU, wherein the newly-added CLC is connected with the CCC to form the cluster system, wherein the newly-added CLC functions as a stand-alone network router, the method comprising:
changing an operation mode of the newly-added CLC to a multi-chassis operation mode;
registering the CCC as a slave chassis to the newly-added CLC, wherein the CCC and the newly-added CLC are both active;
backing up configuration information of a first active MPU of the newly-added CLC into a second active MPU of the CCC, and the second active MPU of the CCC which has the backed up configuration information of the first active MPU of the newly-added CLC is configured to function as an acting standby MPU of the newly-added CLC;
subsequent to the backing up of the configuration information of the first active MPU of the newly-added CLC into the second active MPU of the CCC wherein the newly-added CLC is different from the CCC, rearranging MPUs' active and standby relationship of the CCC by the newly-added CLC, by handing over equipment management rights of the newly-added CLC to the CCC through switching roles between the first active MPU and the acting standby MPU of the newly-added CLC, wherein the first active MPU of the newly-added CLC is configured to function as a standby MPU of the newly-added CLC which becomes no longer active and has no management right over the newly-added CLC, while the second MPU of the CCC is configured from the acting standby MPU of the newly-added CLC to now function as an active MPU of the newly-added CLC to take over the management right of the newly-added CLC;

changing, by the newly-added CLC, its own operation mode to a three-stage exchange mode; wherein the CCC functions as a second stage exchange network equipment which manages the newly-added CLC which functions as a first or a third stage switched network router.

2. The method according to claim 1, wherein the newly-added CLC is connected with the CCC via active and standby links, and comprising switching equipment management right to the CCC via an idle link of the active and standby links, so that the CCC manages the newly added CLC.

3. The method according to claim 1, wherein if the cluster system further comprises a newly-added CCC, the newly-added CCC is connected with the CCC via active and standby links, and the newly-added CCC is connected with the newly-added CLC via the active and standby links, and the method further comprises:

changing operation modes of the newly-added CCC and the CCC, wherein the newly-added CCC registers with the CCC, so as to become a slave chassis of the CCC; and changing the MPUs' active or standby relationship of the CCC.

4. The method according to claim 3, wherein the rearranging of the MPU's active or standby relationship of the CCC comprises:

setting a standby MPU of the CCC to function as an active MPU of the newly-added CCC.

5. The method according to claim 4, wherein if the cluster system comprises at least three CCCs, and the at least three CCCs form a ring network by connecting with each other in a pair-wise manner.

6. The method according to claim 4, wherein the method further comprises changing a standby relationship of the MPUs in the cluster system to 1: N standby.

7. A cluster line-card device, wherein the cluster line-card device is a Cluster Line-card Chassis (CLC) which comprises at least one MPU, wherein the newly-added CLC has been newly connected with a Cluster Central Chassis (CCC) having at least two processing units (MPUs), wherein the CLC functions as a stand-alone network router, and the CLC comprises:

a port which connects to the CCC;
a control plane establishing unit which establishes a control plane, and the control plane establishing unit comprising:

a Main Processing Unit (MPU) standby relationship changing unit; wherein the MPU standby relationship changing unit comprises: an operation mode setting unit, which changes an operation mode of the CLC to a multi-chassis operation mode; a receiving and registering unit, which receives registration information from the CCC, and registers the CCC as a slave chassis to the CLC wherein the CCC and the CLC are both active;

a backup unit which backs up configuration information of a first active MPU of the CLC into a second active MPU of the CCC, and the second active MPU of the CCC which has the backed up configuration information of the first active MPU of the CLC is configured to function as an acting standby MPU of the CLC; and a switching unit, which upon subsequent to the backing up of the configuration information of the first active MPU of the CLC into the second active MPU of the CCC wherein the newly-added CLC is different from the CCC, rearranges MPUs' active and standby relationship of the CCC by the CLC, by switching an equipment management right of the CLC over to the CCC, so that the CCC manages the CLC; wherein the switching unit comprises:

a control plane switching unit, which switches roles between the first active MPU and the acting standby MPU of the CLC, wherein the first active MPU of the CLC is configured to function as a standby MPU of the CLC which becomes no longer active and has no management right over the newly-added CLC, while the second active MPU of the CCC is configured from the acting standby MPU of the CLC to now function as an active MPU of the CLC to take over the management right of the newly-added CLC;

an exchange plane switching unit, which changes an operation mode of the CLC to a three-stage exchange mode; wherein the CCC functions as a second stage exchange network equipment which manages the CLC which functions as a first or a third stage switched network router.

8. The cluster line-card device according to claim 7, wherein the MPU standby relationship changing unit is enabled to change a standby relationship of the MPUs of the CLC and the CCC to 1: N standby.

9. The cluster line-card device according to claim 7, wherein the CLC is connected to the CCC via active and standby links, and the switching unit switches the equipment management right of the CLC to the CCC via an idle link of the active and standby links, such that the CCC manages the CLC.

* * * * *